(12) United States Patent
Komori et al.

(10) Patent No.: US 8,140,114 B2
(45) Date of Patent: Mar. 20, 2012

(54) RECEIVING DEVICE AND ANTENNA

(75) Inventors: Chisato Komori, Ishikawa (JP);
Yoshitaka Yoshino, Tokyo (JP); Koichi Mukai, Ishikawa (JP)

(73) Assignee: Sony Corporation, Tokyo (JP)

( * ) Notice: Subject to any disclaimer, the term of this patent is extended or adjusted under 35 U.S.C. 154(b) by 959 days.

(21) Appl. No.: 12/048,526

(22) Filed: Mar. 14, 2008

(65) Prior Publication Data
US 2008/0234015 A1 Sep. 25, 2008

(30) Foreign Application Priority Data

Mar. 19, 2007 (JP) ................... 2007-070079

(51) Int. Cl.
*H04M 1/00* (2006.01)
(52) U.S. Cl. ............... 455/556.1; 455/562.1; 455/550.1
(58) Field of Classification Search ............ 455/77, 455/550.1, 553.1, 556.1, 562.1, 132, 149, 455/177.1, 178.1, 180.2, 182.3, 184.1, 192.3, 455/193.1, 269, 278.1, 283, 295, 296
See application file for complete search history.

(56) References Cited

U.S. PATENT DOCUMENTS

| | | | |
|---|---|---|---|
| 6,339,696 B1 * | 1/2002 | Chan et al. | 455/62 |
| 7,254,378 B2 * | 8/2007 | Benz et al. | 455/277.1 |
| 7,567,784 B2 * | 7/2009 | Choi | 455/132 |
| 2006/0234653 A1 * | 10/2006 | Yamamoto | 455/121 |
| 2008/0254831 A1 * | 10/2008 | Mukai et al. | 455/557 |
| 2011/0069844 A1 * | 3/2011 | Krampf et al. | 381/58 |

FOREIGN PATENT DOCUMENTS

| | | |
|---|---|---|
| JP | 61-046601 | 3/1986 |
| JP | 09-312894 | 12/1997 |
| JP | 2005-064742 | 3/2005 |
| JP | 2005-333613 | 12/2005 |
| JP | 2006-025392 | 1/2006 |
| JP | 2006-108942 | 4/2006 |

* cited by examiner

*Primary Examiner* — Andrew Wendell
(74) *Attorney, Agent, or Firm* — SNR Denton US LLP

(57) ABSTRACT

An antenna, to be connected to a receiving device for receiving broadcast waves in first and second frequency bands, includes a core-wire-side cable for transmitting a signal or an electric power used in the receiving device, and a covered wire for covering a part of the core-wire-side cable from a receiving-device-side end of the core-wire-side cable to a given point before an end that is on the opposite side of the receiving-device-side end so as to shield the core-wire-side cable. The covered wire functions as a first antenna unit for receiving a broadcast wave in the first frequency band, whereas the core-wire-side cable functions as a second antenna unit for receiving a broadcast wave in the second frequency band.

10 Claims, 7 Drawing Sheets

| FREQUENCY | 76 | 86 | 95 | 107 | 188.5 | 192.5 | 194.5 | 198.5 |
|---|---|---|---|---|---|---|---|---|
| GAIN | -25.66 | -15.02 | -14.86 | -16.52 | -10.01 | -7.93 | -7.04 | -8.57 |

| FREQUENCY | 76 | 86 | 95 | 107 | 188.5 | 192.5 | 194.5 | 198.5 |
|---|---|---|---|---|---|---|---|---|
| GAIN | -25.66 | -27.62 | -31.46 | -24.99 | -19.37 | -17.30 | -16.64 | -15.67 |

| FREQUENCY | 76 | 86 | 95 | 107 | 188.5 | 192.5 | 194.5 | 198.5 |
|---|---|---|---|---|---|---|---|---|
| GAIN | -16.53 | -15.02 | -15.46 | -14.93 | -25.77 | -26.37 | -26.27 | -26.77 |

| FREQUENCY | 76 | 86 | 95 | 107 | 188.5 | 192.5 | 194.5 | 198.5 |
|---|---|---|---|---|---|---|---|---|
| GAIN | -19.82 | -21.42 | -24.46 | -24.46 | -26.52 | -26.24 | -26.20 | -26.47 |

| FREQUENCY | 76 | 86 | 95 | 107 | 188.5 | 192.5 | 194.5 | 198.5 |
|---|---|---|---|---|---|---|---|---|
| GAIN | -22.18 | -22.22 | -23.26 | -20.99 | -9.17 | -9.44 | -9.20 | -8.57 |

| FREQUENCY | 76 | 86 | 95 | 107 | 188.5 | 192.5 | 194.5 | 198.5 |
|---|---|---|---|---|---|---|---|---|
| GAIN | -21.82 | -22.22 | -22.66 | -19.59 | -11.62 | -11.84 | -11.80 | -11.37 |

RECEIVING DEVICE AND ANTENNA

CROSS REFERENCES TO RELATED APPLICATIONS

The present invention contains subject matter related to Japanese Patent Application JP 2007-070079 filed in the Japanese Patent Office on Mar. 19, 2007, the entire contents of which are incorporated herein by reference.

BACKGROUND OF THE INVENTION

1. Field of the Invention

The present invention relates to receiving devices and antennas, and can be applied to, for example, mobile phones capable of receiving digital radio broadcasting. The present invention suggests an antenna having a superior mechanical strength, a superior design, and improved performance resulting from a configuration that is more simplified than that of the related art by shielding a part of core-wire-side cables from a main-unit-side end thereof to a given point before the other end thereof with a covered wire and connecting the main-unit-side end of this covered wire to a tuner, and a receiving device employing this antenna.

2. Description of the Related Art

In the related art, various improvements are attempted regarding antennas in portable receiving devices. More specifically, such antennas are desired not to spoil a design of receiving devices, to prevent an influence on a human body, and to be more resistant to an influence of noises emitted from other devices.

Regarding the design among these desires, improvements for not spoiling the design have been made on receiving devices by including an antenna therein. However, when the reception frequency is low, the size of antennas becomes larger, which makes it difficult to include the antennas in the receiving devices. Accordingly, in the related art, when the reception frequency is low, receiving devices generally employ rod antennas. Still, the use of a rod antenna complicates a configuration of receiving devices and undesirably spoils the design thereof due to protrusion of the rod antenna.

Accordingly, various methods for using an earphone cable as an antenna have been suggested recently. However, when an earphone cable is simply used as an antenna, the earphone cable touches a human body and a position touching the human body also changes variously, which prevents the earphone cable from fully demonstrating a function as an antenna.

Accordingly, in the related art, e.g., in Japanese Unexamined Patent Application Publication No. 2005-64742, various improvements for preventing a portion of an earphone cable touching a human body from functioning as an antenna when the earphone cable is used as an antenna have been suggested.

Nevertheless, in these methods, a high-frequency blocking element for blocking high-frequency signals from flowing into a specific region has to be provided at a junction part of a portion not functioning as an antenna and a portion functioning as an antenna. This undesirably complicates a configuration of the junction part, and further deteriorates a mechanical strength at the junction part. A design is also restricted undesirably. In addition, it is difficult to completely block a flow of high-frequency signals into the specific region even if a high-frequency blocking circuit is provided at the junction part. For this reason, issues not fully solved for practical use still exist regarding the performance.

SUMMARY OF THE INVENTION

Embodiments of the present invention are made in view of the foregoing disadvantages, and overcome these disadvantages. The present invention is to suggest an antenna having a superior mechanical strength, a superior design, and improved performance resulting from a configuration that is more simplified than that of the related art, and a receiving device using this antenna.

To this end, a receiving device according to an embodiment of the present invention includes a core-wire-side cable for transmitting a signal or an electric power used in a main unit, a covered wire for covering a part of the core-wire-side cable from a main-unit-side end of the core-wire-side cable to a given point before an end that is on the opposite side of the main-unit-side end so as to shield the core-wire-side cable, a first high-frequency blocking circuit, provided at the main-unit-side end of the core-wire-side cable, for blocking a high-frequency signal from entering the main unit from the core-wire-side cable, and a tuner unit, connected to a main-unit-side end of the covered wire, for receiving a broadcast wave in a first frequency band corresponding to the length of the covered wire and a broadcast wave in a second frequency band corresponding to the length of the core-wire-side cable.

An antenna according to another embodiment of the present invention that is connected to a receiving device for receiving a broadcast wave in first and second frequency bands includes a core-wire-side cable for transmitting a signal or an electric power used in the receiving device, and a covered wire for covering a part of the core-wire-side cable from a receiving-device-side end of the core-wire-side cable to a given point before an end that is on the opposite side of the receiving-device-side end so as to shield the core-wire-side cable. The covered wire functions as a first antenna unit for receiving a broadcast wave in the first frequency band, whereas the core-wire-side cable functions as a second antenna unit for receiving a broadcast wave in the second frequency band.

According to the embodiments, since the covered wire covers and shields the core-wire-side cable, enough isolation between the covered wire and the core-wire-side cable can be maintained regarding a high-frequency signal. Thus, only the covered wire is allowed to function as an antenna. At this time, since a base part of the main unit is set as a feeding point and the covered wire extends midway of the core-wire-side cable, it is possible to prevent the covered wire from touching a human body even when the core-wire-side cable, which extends farther than the covered wire, touches the human body, thereby being able to improve the performance. In addition, a high-frequency blocking circuit does not have to be provided at an end of the covered wire opposite to the main-unit-side, which can make a configuration simpler than that of the related art, can increase a mechanical strength, and can make a design superior. Additionally, the performance can be also improved in the second frequency band since an electrical length is increased due to coupling between the core-wire-side cable and the covered wire.

According to embodiments of the present invention, an antenna having a superior mechanical strength, a superior design, and improved performance resulting from a configuration that is more simplified than that of the related art, and a receiving device using this antenna can be obtained.

DESCRIPTION OF THE PREFERRED EMBODIMENTS

Embodiments of the present invention will be described in detail below with reference to the accompanying drawings.

Embodiment 1

1) Configuration According to Embodiment

Figure 1:
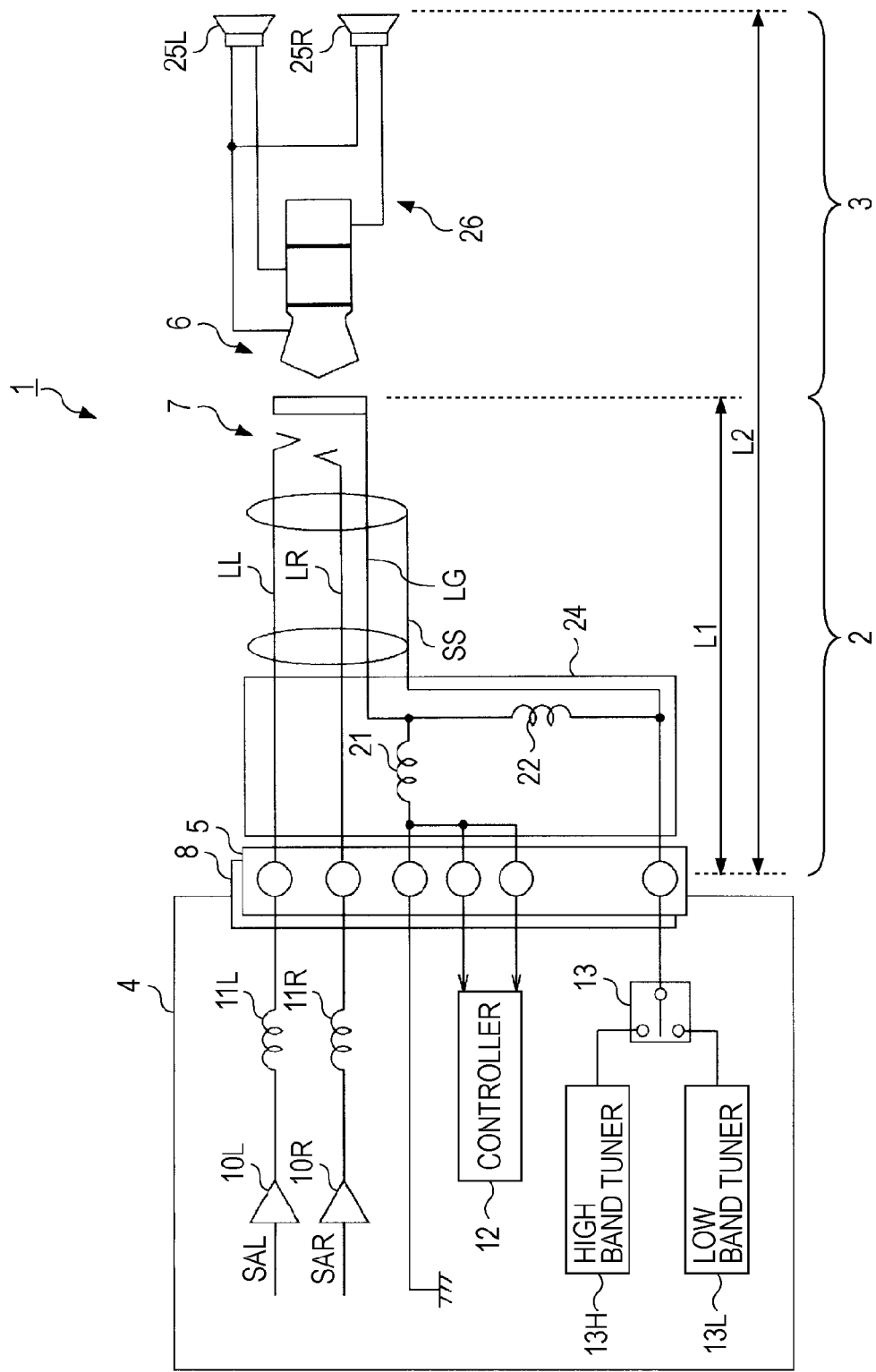
FIG. 1 is a block diagram showing a mobile phone according to an embodiment 1 of the present invention.
Figure 2:
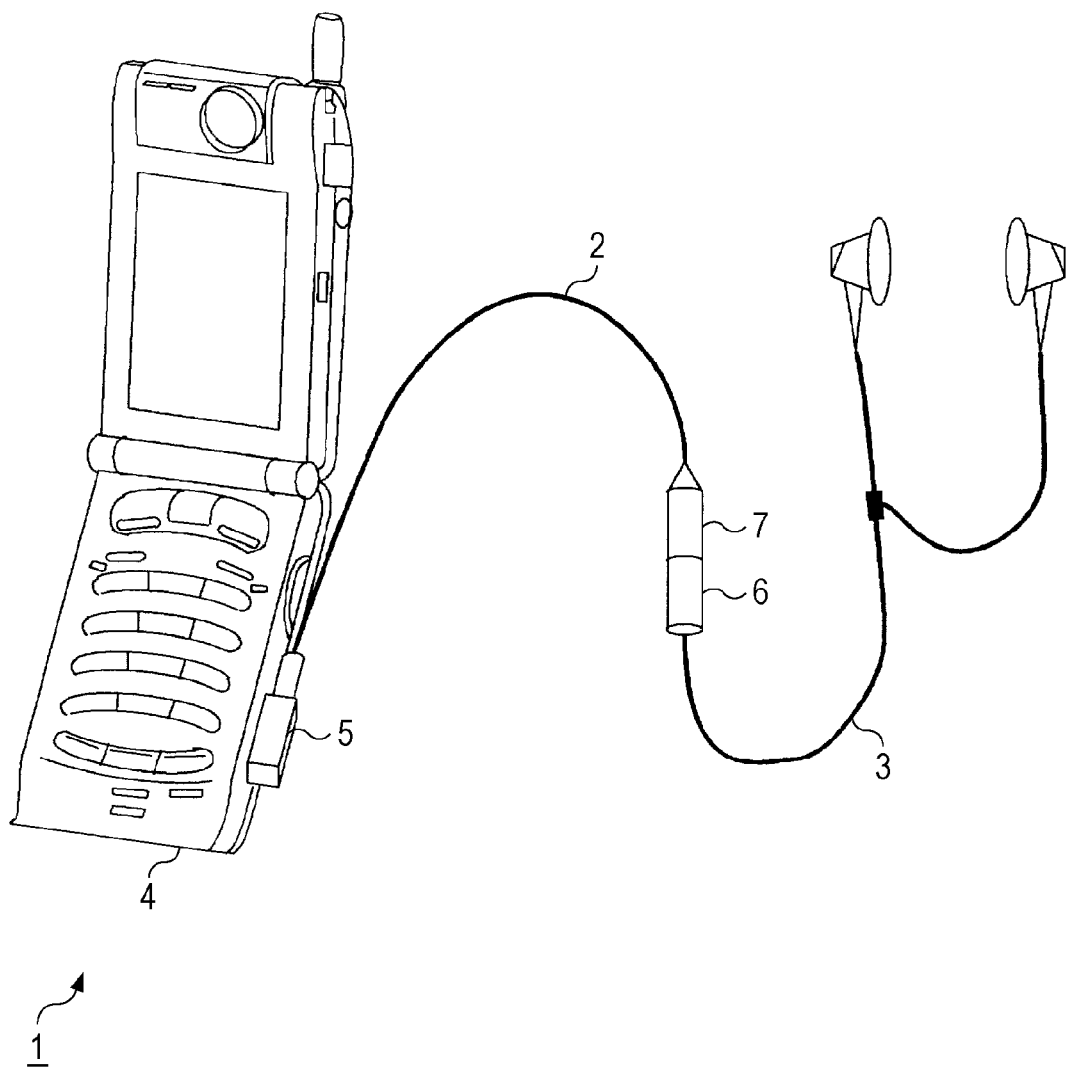
FIG. 2 is a perspective view of a mobile phone shown in FIG. 1.

FIG. 1 is a block diagram partially showing a mobile phone serving as a receiving device according to an embodiment 1 of the present invention. FIG. 2 is a perspective view of this mobile phone. This mobile phone 1 has a function of receiving radio broadcasting. By connecting earphones 3 to a main unit 4 through a junction cable 2, the mobile phone 1 receives radio broadcasting using the junction cable 2 and the earphones 3 as an antenna.

Accordingly, the junction cable 2 has a plug 5 for connecting to the main unit 4 at one end, and a jack 7 for receiving a plug 6 of the earphone 3 at the other end. In addition, the main unit 4 has a jack 8 for receiving the plug 5 of the junction cable 2.

In the main unit 4, amplifying circuits 10L and 10R amplify a left-channel audio signal SAL and a right-channel audio signal SAR, respectively, and output the amplified audio signals to the jack 8. High-frequency blocking circuits 11L and 11R are provided between the amplifying circuits 10L and 10R and the jack 8, respectively. The high-frequency blocking circuits 11L and 11R prevents high-frequency signals from entering the main unit 4 from the jack 8. Although the high-frequency blocking circuits 11L and 11R are constituted by ferrite bead inductors arranged on output lines of the amplifying circuits 10L and 10R respectively in this embodiment, various kinds of low-pass filters can be widely employed, for example.

A controller 12 controls operations of this mobile phone 1. The controller 12 detects a potential difference between two plug detecting terminals provided in the jack 8 to detect connection of the junction cable 2, and controls operations of each part on the basis of the detection results.

A high band tuner 13H receives digital radio broadcasting, which employs broadcast waves in a frequency band of 190 MHz. A low band tuner 13L receives FM (Frequency Modulation) broadcasting, which employs broadcast waves in a frequency band of 70 to 110 MHz, and audio of low band television broadcasting. In response to a user operation, the controller 12 switches between operations of the high band tuner 13H and the low band tuner 13L, and selectively connects an antenna input terminal of the high band tuner 13H or the low band tuner 13L to the jack 8 through a section circuit 13.

Figure 3:
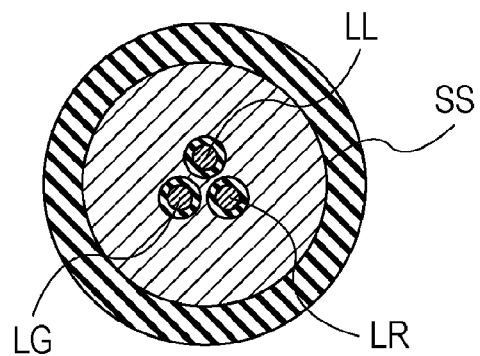
FIG. 3 is a cross-sectional view of a junction cable.

As the cross section thereof is shown in FIG. 3, a multiwire shielded cable having three core wires is used as the junction cable 2. The junction cable 2 includes three core wire cables LL, LR, and LG, and a covered wire SS that coaxially covers and shields these three core wire cables LL, LR, and LG. The three core wire cables LL, LR, and LG are assigned to transmission of audio signals. The three core wire cables LL, LR, and LG are closely arranged. The covered wire SS coaxially covers the core wire cables LL, LR, and LG so that the center of three core wire cables LL, LR, and LG in the cross section is set at the center of the circular covered wire SS.

The core wire cable LG, among the three core wire cables LL, LR, and LG of the junction cable 2, is assigned as a ground line. An end of the core wire cable LG on the side of the main unit 4 (hereinafter, referred to as a main-unit-4-side end) is connected to a ground of the main unit 4 through the plug 5 and the jack 8. More specifically, the core wire cable LG serving as the ground line is connected to the plug 5 through a ferrite bead high-frequency blocking circuit 21. Meanwhile, for example, various kinds of low-pass filters, instead of a ferrite bead inductor, can be widely employed as this high-frequency blocking circuit 21. The core wire cable LG serving as the ground line, i.e., a main-unit-4-side end of the high-frequency blocking circuit 21, is also connected to the two plug detecting terminals provided in the jack 8.

Main-unit-4-side ends of the remaining two core wire cables LL and LR are connected to the amplifying circuits 10L and 10R through the plug 5, the jack 8, and the high-frequency blocking circuits 11L and 11R, respectively.

The covered wire SS is formed by a so-called braided wire. A main-unit-4-side end of the covered wire SS is connected to the selection circuit 13 of the main unit 4 through the plug 5 and the jack 8. The covered wire SS is also connected to the core wire cable LG serving as the ground line at a base part of the plug 5 through a ferrite bead high-frequency blocking circuit 22. Meanwhile, for example, various kinds of low-pass filters, instead of a ferrite bead inductor, can be widely employed as this high-frequency blocking circuit 22.

The high-frequency blocking circuits 21 and 22, the plug 5, the core wire cables LL, LR, and LG, and the covered wire SS of the conjunction cable 2 are mounted on a substrate 24, and are connected to each other through interconnecting patterns provided on this substrate 24.

The three core wire cables LL, LR, and LG of the junction cable 2 are connected to the jack 7 on a side opposite to the side of the main unit 4. The covered wire SS, on the other hand, is not connected to any lines. Magnet wires constituting the braided wire of the covered wire SS are soldered so that the braded wire does not become loose. A length L1 of the covered wire SS of the junction cable 2 is set to 430 mm, which is substantially equal to ¼ of a wavelength of a specific broadcast wave in a frequency band received by the high band tuner 13H. The jack 7 and the plug 5 of the junction cable 2 are molded by a resin to cover the soldered portion of the covered wire SS and the substrate 24.

One end of cable 26, having a predetermined length, of the earphones 3 is connected the jack 7, while the other end of the cable 26 is connected to speakers 25L and 25R. A length L2 of the conjunction cable 2 and the earphones 3 between the plug 5 and the speaker 25L is set to 1200 mm, which is substantially equal to ¼ of a wavelength of a specific broadcast wave in a frequency band received by the low band tuner 13L. The earphones 3 are also molded by a resin to cover the cable-connected portion in the plug 6. Hereinafter, the core wire cables LL, LR, and LG and the cable 26 of the earphones 3 that are connected to each other through the plug 6 and the jack 7 are referred to as core-wire-side cables.

2) Operations According to Embodiment

With the above-described configuration, this mobile phone 1 actives an operation of the high band tuner 13H or the low band tuner 13L in response to a user operation, and connects the antenna input terminal of the high band tuner 13H or the low band tuner 13L to the junction cable 2 through the section circuit 13. This junction cable 2 or the junction cable 2 and the cable 26 of the earphones 3 connected to the junction cable 2 function as an antenna, whereby the mobile phone 1 receives a desired broadcast wave using the high band tuner 13H or the low band tuner 13L, and reproduces the audio signals SAL and SAR. In addition, the audio signals SAL and SAR are amplified by the amplifying circuits 10L and 10R, respectively, and are output to the junction cable 2. The output audio signals, in turn, drives the speakers 25L and 25R, whereby the mobile phone 1 provides audio of the broadcast wave received by the high band tuner 13H or the low band tuner 13L to users. In such a manner, the mobile phone 1 allows users to enjoy various broadcast contents with the earphones 3.

In the mobile phone 1, the audio signals SAL and SAR are output to the speakers 25L and 25R through the high-frequency blocking circuits 11L and 11R, the core wire cables LL, LR, and LG of the junction cable 2, and the cable 26 of the earphones 3, respectively. Since the high-frequency blocking circuits 11L and 11R are provided at a base part of the main unit 4, high-frequency signals caused by the cable 26 of the earphones 3 or the like are prevented from entering the main unit 4. This allows the amplifying circuits 10L and 10R to operate stably, and users can enjoy various contents.

In the mobile phone 1, an antenna input terminal of the high band tuner 13H or the low band tuner 13L is connected to the covered wire SS of the junction cable 2, which coaxially covers and shields the core wire cables LL, LR, and LG, through the selection circuit 13. Accordingly, the high band tuner 13H or the low band tuner 13L receives a broadcast wave using a high-frequency signal caused by the covered wire SS.

Figure 4:
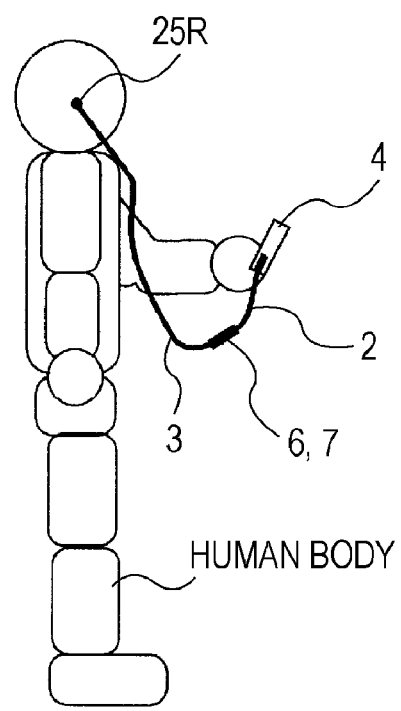
FIG. 4 is an outlined line drawing for use in explanation of an antenna of a mobile phone shown in FIG. 1.

The main-unit-4-side end of the covered wire SS is connected to the core wire cable LG serving as the ground line through the high-frequency blocking circuit 22. The covered wire SS extends midway of the core-wire-side cables, constituted by the core wire cables LL, LR, and LG and the cable 26 of the earphones 3. The other end of the covered wire SS is not connected to any lines and is left open. Such a configuration allows the covered wire SS to function as a monopole antenna having a feeding point at a base part of the main unit 4. This can prevent the covered wire SS from touching a human body even when the cable 26 of the earphones 3, which is one of the core-wire-side cables that extends farther than the covered wire SS, touches the human body as shown in FIG. 4. Thus, an influence of a human body on a broadcast wave in a frequency band of this covered wire SS is decreased, which can improve the performance.

In addition, when the core wire cables LL, LR, and LG are covered and shielded in the mobile phone 1, a high-frequency signal caused by the cable 26 of the earphones 3 flows into the covered wire SS through capacitive coupling between the core wire cables LL, LR, and LG and the covered wire SS, which allows the cable 26 of the earphones 3 to function as an antenna. For this reason, an occurrence of various unpreferable influences due to a touch of a human body can be expected. However, since the covered wire SS coaxially covers and shields the core wire cables LL, LR, and LG, enough isolation is maintained between the covered wire SS and the core wire cables LL, LR, and LG regarding the high-frequency signal, which thus allows only the covered wire SS to function as an antenna.

More specifically, in the case of employing parallel wires, such as so-called Litz wires used in the cable 26 of the earphones 3, instead of the core wire cables LL, LR, and LG and the covered wire SS, high-frequency coupling is caused between the lines up to the point of the jack 7 and a transmission path for transmitting audio signals also functions as an antenna even if a high-frequency signal is blocked by providing a high-frequency blocking circuit at a position corresponding to the position of the jack 7. Accordingly, in this case, if the earphone-side cable 26 touches a human body, the performance of the antenna deteriorates. However, according to this embodiment, it is shown that an influence of a human body is decreased and the performance of the antenna can be improved.

Since an unpreferable influence of a human body can be prevented even if a high-frequency blocking circuit or the like is not provided at the earphone-3-side end of the covered wire SS, it is possible to make a configuration of the earphone-3-side end simpler, to increase a mechanical strength, and to make a design superior. In addition, since enough isolation can be maintained, the performance of the antenna can be improved by preventing high-frequency signals caused by the cable 26 of the earphones 3 or the like from mixing.

Additionally, the length L1 of the covered wire SS is set substantially equal to ¼ of a wavelength of a specific broadcast wave in the frequency band of the high band tuner 13H in this embodiment. Accordingly, a high-frequency signal in the frequency band of the high band tuner 13H is efficiently caused in the covered wire SS and is input to the high band tuner 13H, whereby the performance of the antenna is further improved.

In particular, the high band tuner 13H receives a broadcast wave of digital radio broadcasting in this embodiment. The characteristic of an antenna significantly deteriorates due to a touch of a human body in the frequency band of this digital radio broadcasting. Thus, when the covered wire SS is caused to function as an antenna in a frequency band of the high band tuner 13H as this embodiment, a remarkably high performance antenna can be obtained.

Additionally, the length of the core-wire-side cables, which are constituted by the core wire cables LL, LR, and LG and the cable 26 of the earphones 3, is set equal to or longer than twice the length L1 of the covered wire SS. This can prevent the core-wire-side cables from functioning as an antenna in the frequency band of the high band tuner 13H, which can reduce various unpreferable influences due to a touch of a human body onto the cable 26 of the earphones 3, and thus can improve the performance of an antenna.

On the other hand, when the low band tuner 13L receives a broadcast wave, an electrical length of an antenna constituted by the covered wire SS increases by the length of the cable 26 of the earphones 3 due to coupling between the covered wire SS and the core wire cables LL, LR, and LG in the mobile phone 1. This allows the covered wire SS and the cable 26 of the earphones 3 to function as an antenna. Accordingly, an antenna gain increases by an amount corresponding to the extended length of the electrical length in the mobile phone 1, and the performance can be improved.

In this case, the length of the core wire cables LL, LR, and LG and the cable 26 of the earphones 3 is set substantially equal to ¼ of a wavelength of a broadcast wave received by the low band tuner 13L in this embodiment. Accordingly, high-frequency signals are efficiently caused in the covered wire SS and the cable 26 of the earphones 3, and are input to the low band tuner 13L, which can also improve the performance.

In addition, the degree of deterioration of the performance of an antenna due to a touch of a human body is relatively small in a frequency band assigned to the low band tuner 13L. In this embodiment, all of receivable frequency bands are appropriately divided into a frequency band assigned to an antenna constituted by the covered wire SS and a frequency band assigned to an antenna constituted by the core-wire-side cables according to the degree of an influence of a touch of a human body. Thus, the performance of an antenna regarding all of receivable frequency bands can be improved.

Figures 5, 6, 7:
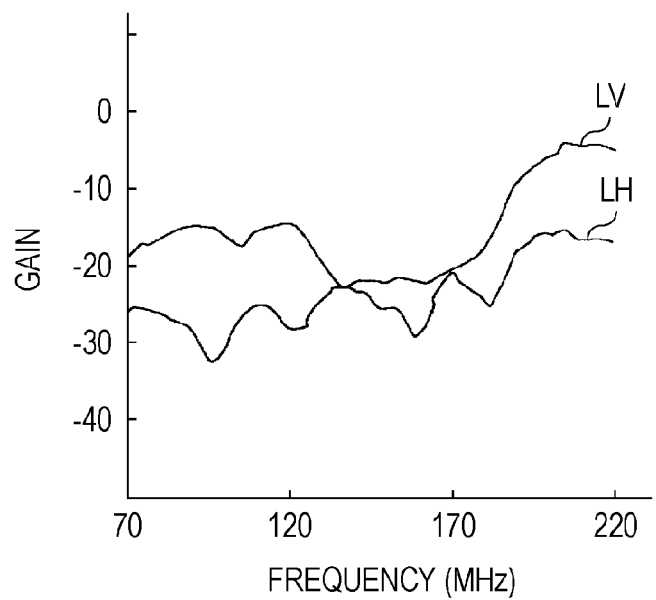
FIG. 5 is a diagram of a characteristic curve showing a characteristic of an antenna of a mobile phone shown in FIG. 1.
FIG. 6 is a table showing a characteristic of vertical polarization according to a characteristic curve shown in FIG. 5.
FIG. 7 is a table showing a characteristic of horizontal polarization according to a characteristic curve shown in FIG. 5.

More specifically, FIG. 5 is a diagram of a characteristic curve showing an antenna gain obtained using the junction cable 2 and the earphones 3 according to this embodiment. Measurement results of vertical polarization and horizontal polarization are denoted by LV and LH, respectively. FIGS. 6 and 7 are tables showing measurement results of vertical polarization and horizontal polarization, respectively.

Figures 8, 9, 10:
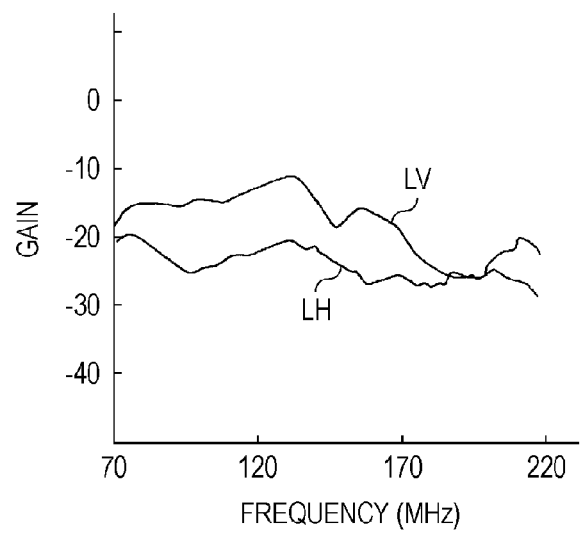
FIG. 8 is a diagram of a characteristic curve showing a characteristic of an antenna used in the related art.
FIG. 9 is a table showing a characteristic of vertical polarization according to a characteristic curve shown in FIG. 8.
FIG. 10 is a table showing a characteristic of horizontal polarization according to a characteristic curve shown in FIG. 8.

On the other hand, FIGS. 8 to 10 are diagrams showing, in contrast with FIGS. 5 to 7, measurement results obtained with an antenna in the related art. FIGS. 8 to 10 indicate that little difference exists between this embodiment and the related art in a frequency band of 70 to 100 MHz assigned to the low band tuner 13L, whereas the performance is improved in a frequency band of 190 MHz, which is a frequency band of digital radio broadcasting, since a gain increases than that obtained in the related art by approximately 10 dB.

Figures 11, 12, 13:
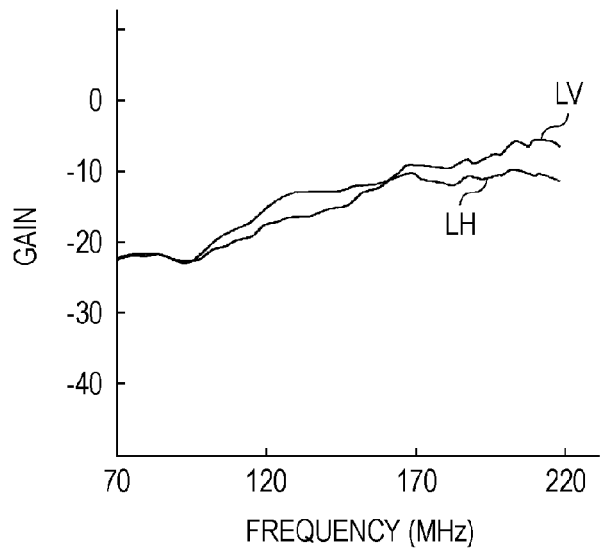
FIG. 11 is a diagram of a characteristic curve showing a characteristic of an antenna when earphones are removed from a mobile phone shown in FIG. 1.
FIG. 12 is a table showing a characteristic of vertical polarization according to a characteristic curve shown in FIG. 11.
FIG. 13 is a table showing a characteristic of horizontal polarization according to a characteristic curve shown in FIG. 11.

Additionally, FIGS. 11 to 13 are diagrams showing, in contrast with FIGS. 5 to 7, characteristics obtained when the earphones 3 are removed. FIGS. 11 to 13 indicate that, although a gain decreases a little in a frequency band assigned to the low band tuner 13L since the electrical length shortens when the earphones are removed, the performance is improved when it is compared with the related art in all of receivable frequency bands.

3) Advantages of Embodiment

The above-described configuration can offer an antenna having a superior mechanical strength, a superior design, and improved performance resulting from a configuration that is more simplified than that of the related art by shielding a part of core-wire-side cables from a main-unit-side end thereof to a given point before the other end thereof with a covered wire and connecting the main-unit-side end of this covered wire to a tuner, and a receiving device employing this antenna.

Additionally, the core-wire-side cables transmit audio signals to drive speakers, whereby the earphones are used as an antenna. This can prevent the design from worsening due to addition of another antenna.

In addition, a jack and a plug are provided at an end of a covered wire near the side of speakers, and earphones are configured to be removable. Accordingly, only a junction cable can be used as an antenna if necessary.

By setting the length of a covered wire substantially equal to ¼ of a wavelength of a broadcast wave assigned to a high band tuner and by setting the length of core-wire-side cables substantially equal to ¼ of a wavelength of a broadcast wave assigned to a low band tuner, these broadcast waves can be efficiently received and transmitted to the tuners, which thus can improve the performance.

Furthermore, by assigning digital radio broadcast waves to a high band tuner, it is possible to decrease or eliminate an influence of a touch of a human body in a frequency band that is easily influenced by the touch of the human body. Accordingly, the performance of a whole receiving device can be improved.

Embodiment 2

Figure 14:
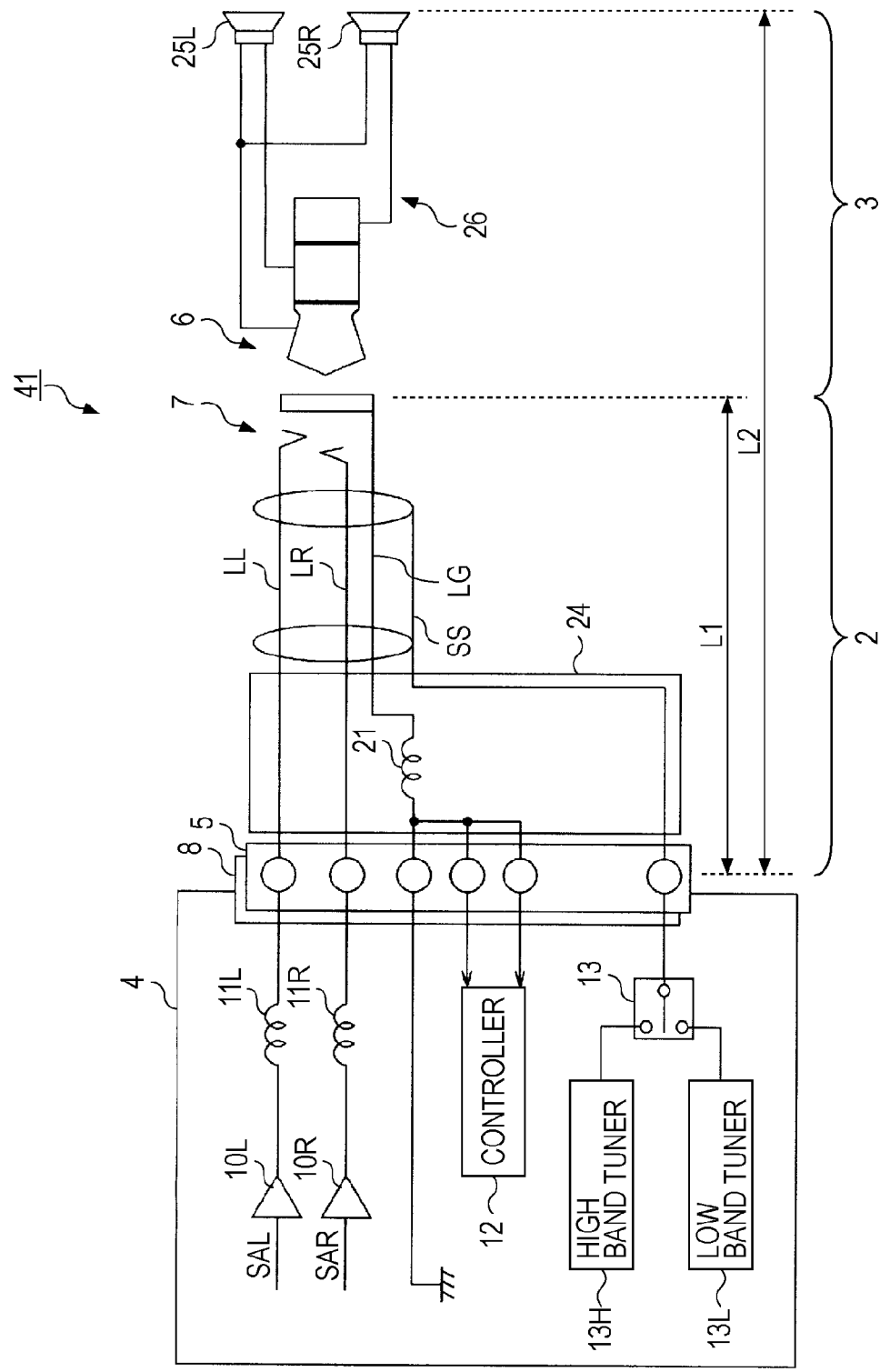
FIG. 14 is a block diagram showing a mobile phone according to a second embodiment of the present invention.

FIG. 14 is a block diagram showing, in contrast with FIG. 1, a mobile phone according to an embodiment 2 of the present invention. This mobile phone 41 is configured in a manner similar to that of the mobile phone 1 according to the embodiment 1 except for removal of the high-frequency blocking circuit 22 and the separate use of a ground terminal by an antenna and audio signals.

This embodiment can offer advantages similar to those of the embodiment 1 with a much simpler configuration since the high-frequency blocking circuit 22 is removed.

Embodiment 3

Although a case where high-frequency blocking circuits for core wire cables are provided in a main unit has been described in the foregoing embodiments, the circuits may be provided in a junction cable.

In addition, although a case where earphones are removably connected to a junction cable through a plug and a jack has been described in the foregoing embodiments, the present invention is not limited to this particular example. The earphones and the junction cable may be integrated if necessary.

Additionally, although a case where a junction cable is removably connected to a main unit has been described in the foregoing embodiments, the present invention is not limited to this particular example. The junction cable may be fixed to the main unit if necessary.

Furthermore, although a case where digital radio broadcasting is received by a junction cable has been described in the foregoing embodiment, the present invention is not limited to this particular example. Instead of digital radio broadcasting, digital television broadcasting may be received.

Moreover, although a case where an antenna is constituted using a transmission path of audio signals that drive earphones has been described in the foregoing embodiment, the present invention is not limited to this particular example. The present invention can be widely applied to a case where an antenna is constituted using a transmission path of audio signals, such as a line output, a case where an antenna is constituted using a transmission path of signals other than audio signals, e.g., video signals, and a case where an antenna is constituted using a transmission path other than that for signals, namely, a transmission path of the power of various kinds of direct-current power supply, such as, for example, a commercial power supply.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving device comprising:
   a main unit;
   a conjunction cable detachably connectable to the main unit, the conjunction cable comprising a covered wired and a core-wire-side cable contained within the covered wire, the core-wire-side cable configured for transmitting a signal, the core-wire-side cable having insulated signal and ground potential carrying wires therein, each signal wire carrying a relatively low frequency signal, the ground potential wire carrying a ground potential, the covered wired comprising a conductive portion that surrounds the core-wire-side cable and an insulating layer sheathing the covered wire, the conductive portion of the covered wired acting as an electrical shield for the insulated signal and ground potential carrying wires;
   a low-pass filter between each insulated signal carrying wire and a respective signal source in the main unit;
   a low-pass filter between the ground potential carrying wire and a ground potential;
   a low-pass filter between the ground potential carrying wire and the conductive portion of the covered wire; and
   a tuner unit that receives a broadcast signal in a first frequency band corresponding to a length of the covered wire and a broadcast signal in a second frequency band corresponding to the length of the core-wire-side cable, the tuner unit being connected to a main-unit-side end of the covered wire, the conductive portion of the covered wired and the insulated ground potential carrying wire serving as antennae.

2. The device according to claim 1, further comprising:
   at least one speaker connected to the core-wide-side cable, each speaker connected to a respective insulated signal carrying wire, the core-wire-side cable transmitting an audio signal to each speaker.

3. The device according to claim 2, further comprising a plurality of speakers and a jack and a plug for electrically connecting the core-wire-side cable to the speakers.

4. The device according to claim 1 comprising a plurality of insulated signal carrying wires.

5. The device according to claim 1, wherein the length of the covered wire is set to be substantially equal to ¼ of a wavelength of the broadcast signal in the first frequency band.

6. The device according to claim 1, wherein the length of the insulated ground potential carrying wire of the core-wire-side cable is set to be substantially equal to ¼ of a wavelength of the broadcast signal in the second frequency band.

7. The device according to claim 1, wherein the broadcast signal in the first frequency band is a digital radio broadcast signal or digital television broadcast signal.

8. The device of claim 1, wherein a signal capable of driving a speaker unit is carried by each insulated signal carrying wire.

9. The device of claim 1, wherein at least one insulated signal carrying wire carries an electrical power signal.

10. An antenna which is connectable to a receiving device for enabling reception of broadcast signals in first and second frequency bands, the antenna comprising:
    a conjunction cable detachably connectable to the receiving device, the conjunction cable comprising a covered wired and a core-wire-side cable contained within the covered wire, the core-wire-sided cable configured for transmitting a signal or an electric power, the core-wire-side cable having insulated signal and ground potential carrying wires therein, each signal wire carrying a relatively low frequency signal, the insulated ground potential wire carrying a ground potential, the covered wired comprising a conductive portion that surrounds the core-wire-side cable and an insulated layer sheathing the conductive portion, the conductive portion of acting as an electrical shield for the insulated signal and ground potential carrying wires,
    wherein,
    the covered wire functions as a first antenna unit for receiving a broadcast signal in the first frequency band, and the insulated ground potential carrying wire of the core-wire-side cable functions as a second antenna unit for receiving a broadcast signal in the second frequency band,
    a low-pass filter coupled between the conductive portion of the covered wire and the insulated ground potential carrying wire, and
    a low-pass filter coupled to the insulated ground potential carrying wire so that the low-pass filter is connectable between the insulated ground potential carrying wire and a ground potential.

* * * * *